US012212207B2

United States Patent
Lee et al.

(10) Patent No.: US 12,212,207 B2
(45) Date of Patent: Jan. 28, 2025

(54) SPLIT-CORE ASSEMBLY AND STATOR INCLUDING SAME

(71) Applicant: LG Magna e-Powertrain Co., Ltd., Incheon (KR)

(72) Inventors: Ji Won Lee, Incheon (KR); Ji Seong Park, Gyeonggi-do (KR); Jin Su Oh, Incheon (KR); Hyoung Gun Lee, Gyeonggi-do (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 520 days.

(21) Appl. No.: 17/612,827

(22) PCT Filed: May 21, 2019

(86) PCT No.: PCT/KR2019/006099
§ 371 (c)(1),
(2) Date: Nov. 19, 2021

(87) PCT Pub. No.: WO2020/235713
PCT Pub. Date: Nov. 26, 2020

(65) Prior Publication Data
US 2022/0224183 A1     Jul. 14, 2022

(51) Int. Cl.
*H02K 3/52* (2006.01)
*H02K 1/14* (2006.01)
*H02K 3/28* (2006.01)
*H02K 5/22* (2006.01)

(52) U.S. Cl.
CPC ............. *H02K 3/522* (2013.01); *H02K 1/148* (2013.01); *H02K 3/28* (2013.01); *H02K 5/225* (2013.01); *H02K 2203/12* (2013.01)

(58) Field of Classification Search
CPC ............... H02K 1/148; H02K 2203/09; H02K 2203/12; H02K 3/28; H02K 3/522; H02K 5/225
See application file for complete search history.

(56) References Cited

U.S. PATENT DOCUMENTS

2006/0091745 A1   5/2006   Klappenbach et al.
2012/0286593 A1*  11/2012  Yokogawa ............. H02K 3/522
                                                    310/43
2017/0187252 A1   6/2017   Takahashi et al.

FOREIGN PATENT DOCUMENTS

| CN | 101847896 | 9/2010 |
|----|-----------|--------|
| CN | 103457364 | 12/2013 |
| CN | 103688445 | 3/2014 |
| CN | 203537103 U | 4/2014 |
| CN | 103855815 | 6/2014 |

(Continued)

OTHER PUBLICATIONS

Extended European Search Report in European Appln. No. 19929711.0, dated on Nov. 25, 2022, 11 pages.

(Continued)

*Primary Examiner* — Naishadh N Desai
(74) *Attorney, Agent, or Firm* — Fish & Richardson P.C.

(57) ABSTRACT

A stator includes a split-core assembly that includes a split core, a bobbin, a coil, and a terminal holder. The terminal holder has an insulating protrusion, and when two split-core assemblies are coupled to each other, the insulating protrusion of any one terminal holder overlaps the other terminal holder.

20 Claims, 10 Drawing Sheets

(56) References Cited

FOREIGN PATENT DOCUMENTS

| CN | 206461445 U | 9/2017 | |
|----|----|----|----|
| JP | 2004-194367 | 7/2004 | |
| JP | 2008-278691 | 11/2008 | |
| JP | 2011-205876 | 10/2011 | |
| JP | 5260951 | 8/2013 | |
| KR | 10-2013-0022624 | 3/2013 | |
| KR | 10-2018-0013692 | 2/2018 | |
| WO | WO 2018/092209 | 5/2018 | |
| WO | WO-2018092209 A1 * | 5/2018 | ............. H02K 1/146 |
| WO | WO 2018/192817 | 10/2018 | |
| WO | WO-2018192817 A1 * | 10/2018 | ............... H02K 3/52 |

OTHER PUBLICATIONS

International Search Report in International Appln. No. PCT/KR2019/006099, mailed on May 21, 2019, 8 pages.
Office Action in Chinese Appln. No. 201980098635.0, mailed on Jun. 19, 2023, 18 pages (with English translation).
Notice of Allowance in Chinese Appln. No. 201980098635.0, mailed on Feb. 7, 2024, 12 pages (with English translation).

\* cited by examiner

SPLIT-CORE ASSEMBLY AND STATOR INCLUDING SAME

CROSS-REFERENCE TO RELATED APPLICATIONS

This application is a National Stage application under 35 U.S.C. § 371 of International Application No. PCT/KR2019/006099, filed on May 21, 2019. The disclosure of the prior application is incorporated by reference in its entirety.

TECHNICAL FIELD

The present disclosure relates to a split-core assembly and a state including the split-core assembly. The present disclosure, in more detail, relates to a split-core assembly that constitutes a concentrated type motor and includes a plurality of split cores, a coil coupled to each split core, and an insulator coupled between the split core and the coil, and a stator including the split-core assembly.

BACKGROUND

A brushless motor may include a stator and a rotor, where the stator may include a stator core on which a coil is wound. The stator core may be divided into a plurality of parts such as split cores arranged in the circumferential direction of the stator having a ring shape, where an insulator may be coupled between each of the split cores and a coil for insulation between the split core and the coil.

A motor may be classified into a concentrated type motor and a distributed type motor based on the winding type. For example, the concentrated type motor may be used as a driving motor of a hybrid vehicle or an electric vehicle.

In some cases, a driving motor of vehicles may include a conductive holder having accommodation grooves and a U-phase/V-phase/W-phase/N-phase conductive plates that are inserted and fixed in the accommodation grooves of the conductive holder.

For instance, each conductive plate may be bonded to the coil of a stator by welding, the conductive holder is made of a plastic material having non-conductivity, and the conductive plates may be accommodated in the conductive holder made of a copper material.

In some cases, a driving motor of vehicles may include a terminal assembly that includes a holder, a terminal, and a clip.

For instance, wiring may be provided between a wiring terminal of each terminal and a coil, the coils each may be made of a copper material and classified into a U-phase terminal, a V-phase terminal, a W-phase terminal, and an N-phase terminal, and an insulation distance may be maintained by the clip and the holder.

In some cases, several clips and holders may be provided to insulate the terminals, which may increase the number of parts of the assembly. In some cases, a specific assembly process such as bolting may be provided to fasten the conductive holder and the terminal assembly to the upper portion of the stator, which may lead to an increase of the manufacturing cost.

In some cases, a driving motor of vehicles may include a bobbin that includes a body, a coupling groove, and a terminal holder, where the terminal holder is integrated with the bobbin.

In some cases, when the terminal holder is integrated with the bobbin to manufacture a motor for a vehicle, the material cost may be reduced and the manufacturing process may be shortened. However, in some cases, when a plurality of bobbins are circumferentially arranged to form a stator, a gap may be generated between the terminal holders. In this case, the insulation effect of the terminal holders may be decreased and the possibility of current leakage may be increased.

SUMMARY

The present disclosure describes a stator and a split-core assembly in which the portion between a split core and a conductive plate can be effectively and stably shielded by an insulator (a nonconductor), where the stator or the split-core assembly includes an individual terminal holder for each split core.

The present disclosure further describes a stator and a split-core assembly in which terminals can effectively and stably overlap each other by providing the stator or the split-core assembly having an individual terminal holder for each split core.

The present disclosure also describes a stator and a split-core assembly in which a wire between a coil and a conductive plate is not exposed over a bobbin and a terminal holder by providing the stator or the split-core assembly having an individual terminal holder for each split core.

According to one aspect of the subject matter described in this application, a split-core assembly of a stator of a motor, where the stator includes a plurality of split-core assemblies that are arranged circumferentially about a central axis of the stator, includes a split core that includes a yoke and a tooth, the tooth extending from the yoke toward the central axis of the stator, a bobbin made of an insulator and coupled to an outer surface of the tooth, a coil wound around the bobbin, and a terminal holder made of an insulator and disposed on or above the yoke in an up-down direction along the central axis. The terminal holder defines a plurality of insertion grooves that are spaced apart from one another in a radial direction of the stator and configured to receive downward a plurality of conductive plates electrically connected to the coil. The terminal holder includes an insulating protrusion that protrudes from at least one surface of the terminal holder in a circumferential direction of the stator. The terminal holder is coupled to an adjacent terminal holder of another split-core assembly among the plurality of split-core assemblies, and the insulating protrusion overlaps with the adjacent terminal holder to thereby shield the split core from the plurality of conductive plates.

Implementations according to this aspect can include one or more of the following features. For example, the insulating protrusion can be disposed at each of the plurality of insertion grooves. In some examples, the terminal holder can include a plurality of insulating protrusions that protrude from the at least one surface of the terminal holder in the circumferential direction of the stator and that are arranged in the radial direction of the stator, where the plurality of insulating protrusions include the insulating protrusion. Circumferential lengths of the plurality of insulating protrusions in the circumferential direction can increase based on radial distances of the plurality of insulating protrusions away from the central axis.

In some implementations, the terminal holder can include a plurality of partition walls that include a plurality of middle partition walls that define boundaries of the plurality of insertion grooves, an outer partition wall that is located farther from an end of the coil than the plurality of middle partition walls and spaced apart from the plurality of middle partition walls, and an inner partition wall that is located closer to the end of the coil than the plurality of middle partition walls and spaced apart from the plurality of middle partition walls. The plurality of conductive plates can include a U-phase conductive plate, a V-phase conductive plate, a W-phase conductive plate, and an N-phase conductive plate that each include connection portions configured to connect to the coil, where each of the plurality of middle partition walls and the inner partition wall defines a three-phase terminal groove configured to receive one of the connection portions of the U-phase conductive plate, the V-phase conductive plate, or the W-phase conductive plate. The inner partition wall can further define a neutral terminal groove that receives the connection portion of the N-phase conductive plate.

In some examples, the bobbin can include a winding portion around which the coil is wound, an outer flange that is disposed radially outward relative to the winding portion and protrudes from an outer edge of the winding portion, the outer flange being coupled to the terminal holder, and an inner flange that is disposed radially inward relative to the winding portion and protrudes from an inner edge of the winding portion. The outer flange can define a first groove that receives a first end of the coil coupled to the connection portion of the N-phase conductive plate and a second groove that that receives a second end of the coil coupled to one of the connection portions of the U-phase conductive plate, or the V-phase conductive plate, or the W-phase conductive plate. The first groove can be defined at an upper portion of the outer flange, and the second groove can be defined at the upper portion of the outer flange and spaced apart from the first groove.

In some implementations, the inner partition wall, the plurality of middle partition walls, and the outer partition wall can be arranged in the radial direction of the stator, where an upper end of the outer flange is located higher than upper ends of the plurality of middle partition walls and the inner partition wall in the up-down direction. A radial gap between the outer flange and the inner partition wall can be wider than a radial gap between the inner partition wall and an innermost middle partition wall among the plurality of middle partition walls.

In some implementations, the bobbin can include a first bobbin and a second bobbin that are coupled to each other and surround the tooth, where the first bobbin is coupled to an upper portion of the tooth, and the second bobbin is coupled to a lower portion of the tooth. The first bobbin can include a first winding portion around which an upper portion of the coil is wound, a first outer flange that is disposed radially outward relative to the first winding portion and protrudes from an outer edge of the first winding portion, where the first outer flange is coupled to the terminal holder, and a first inner flange that is disposed radially inward relative to the first winding portion and protrudes from an inner edge of the first winding portion. The first outer flange can define a first groove that receives a first end of the coil coupled to the connection portion of the N-phase conductive plate and a second groove that that receives a second end of the coil coupled to one of the connection portions of the U-phase conductive plate, the V-phase conductive plate, or the W-phase conductive plate. The first groove can be defined at an upper portion of the first outer flange, and the second groove can be defined at the upper portion of the first outer flange and spaced apart from the first groove.

In some implementations, the stator can include the plurality of split-core assemblies that include the split-core assembly described above and that are circumferentially coupled to one another other.

According to another aspect, a split-core assembly of a stator of a motor, where the stator includes a plurality of split-core assemblies that are arranged circumferentially about a central axis of the stator, includes a split core including a yoke and a tooth extending from the yoke toward the central axis, a bobbin made of an insulator and coupled to an outer surface of the tooth, a coil wound around the bobbin, and a terminal holder made of an insulator and disposed on or above the yoke in an up-down direction along the central axis. The terminal holder defines a plurality of insertion grooves that are spaced apart from one another in a radial direction of the stator and configured to receive downward a plurality of conductive plates electrically connected to the coil. The terminal holder includes a bottom plate that defines bottoms of the plurality of insertion grooves, an insulating protrusion that protrudes from a first end of the bottom plate in a circumferential direction of the stator, and an insulating groove that is defined at a second end of the bottom plate opposite to the first end of the bottom plate. The insulating protrusion is coupled to and seated in the insulating groove of another split-core assembly among the plurality of split-core assemblies located adjacent to the split-core assembly.

Implementations according to this aspect can include one or more of the following features. For example, the terminal holder can include a plurality of partition walls that are spaced apart from one another to thereby define the plurality of insertion grooves therebetween, where the insulating protrusion further protrudes from at least one of plurality of partition walls in the circumferential direction of the stator such that the insulating protrusion has an L shape. The insulating groove can be a stepped groove that is defined along the second end of the bottom plate and at least one of the plurality of partition wall such that the insulating groove has the L shape corresponding to the insulating protrusion.

In some implementations, the insulating protrusion and the insulating groove can be disposed at each of the plurality of insertion grooves. In some examples, the terminal holder can include a plurality of insulating protrusions that protrude from the first end of the bottom plate in the circumferential direction and that are arranged in the radial direction of the stator, where the plurality of insulating protrusions include the insulating protrusion. Circumferential lengths of the plurality of insulating protrusions in the circumferential direction can increase based on radial positions of the plurality of insulating protrusions away from the central axis.

In some implementations, the terminal holder can include a plurality of partition walls including a plurality of middle partition walls that define boundaries of the plurality of insertion grooves, an outer partition wall that is located farther from an end of the coil than the plurality of middle partition walls and spaced apart from the plurality of middle partition walls, and an inner partition wall that is located closer to the end of the coil than the plurality of middle partition walls and spaced apart from the plurality of middle partition walls. The plurality of conductive plates can include a U-phase conductive plate, a V-phase conductive plate, a W-phase conductive plate, and an N-phase conductive plate that each include connection portions configured to connect to the coil, where each of the plurality of middle partition walls and the inner partition wall defines a three-phase terminal groove configured to receive one of the connection portions of the U-phase conductive plate, the V-phase conductive plate, or the W-phase conductive plate. The inner partition wall can further define a neutral terminal groove that receives the connection portion of the N-phase conductive plate.

In some examples, the bobbin can include a winding portion around which the coil is wound, an outer flange that is disposed radially outward relative to the winding portion and protrudes from an outer edge of the winding portion, the outer flange being coupled to the terminal holder, and an inner flange that is disposed radially inward relative to the winding portion and protrudes from an inner edge of the winding portion. The outer flange can define a first groove that receives a first end of the coil coupled to the connection portion of the N-phase conductive plate, and a second groove that that receives a second end of the coil coupled to one of the connection portions of the U-phase conductive plate, the V-phase conductive plate, or the W-phase conductive plate. The first groove can be defined at an upper portion of the outer flange, and the second groove can be defined at the upper portion of the outer flange and spaced apart from the first groove.

In some implementations, the inner partition wall, the plurality of middle partition walls, and the outer partition wall can be arranged in the radial direction of the stator, where an upper end of the outer flange is located higher than upper ends of the plurality of middle partition walls and the inner partition wall in the up-down direction. A radial gap between the outer flange and the inner partition wall can be wider than a radial gap between the inner partition wall and an innermost middle partition wall among the plurality of middle partition walls.

In some implementations, the bobbin can include a first bobbin and a second bobbin that are coupled to each other and surround the tooth, where the first bobbin is coupled to an upper portion of the tooth, and the second bobbin is coupled to a lower portion of the tooth. The first bobbin can include a first winding portion around which an upper portion of the coil is wound, a first outer flange that is disposed radially outward relative to the first winding portion and protrudes from an outer edge of the first winding portion, where the first outer flange is coupled to the terminal holder, and a first inner flange that is disposed radially inward relative to the first winding portion and protrudes from an inner edge of the first winding portion. The first outer flange can define a first groove that receives a first end of the coil coupled to the connection portion of the N-phase conductive plate, and a second groove that that receives a second end of the coil coupled to one of the connection portions of the U-phase conductive plate, the V-phase conductive plate, or the W-phase conductive plate. The first groove can be defined at an upper portion of the first outer flange, and the second groove can be defined at the upper portion of the first outer flange and spaced apart from the first groove.

In some implementations, the stator includes the plurality of split-core assemblies that include the split-core assembly described above and are circumferentially coupled to one another other.

According to another aspect, a split-core assembly of a stator of a motor is described. The stator includes a plurality of split-core assemblies that include the split-core assembly and are arranged circumferentially about a central axis of the stator. The split-core assembly includes a split core, a coil wound around the split core, a bobbin made of an insulator and positioned between the split core and the coil, and a terminal holder made of an insulator, where the terminal holder defines a plurality of insertion grooves configured to receive a plurality of conductive plates that are electrically connected to the coil, respectively. The terminal holder includes a bottom plate that defines portions of the plurality of insertion grooves, an insulating protrusion that protrudes from a first end of the bottom plate in a circumferential direction of the stator, and an insulating groove that is defined at a second end of the bottom plate opposite to the first end of the bottom plate. The insulating protrusion is coupled to and seated in the insulating groove of another split-core assembly among the plurality of split-core assemblies located adjacent to the split-core assembly.

Implementations according to this aspect can include one or more of the following features. For example, the terminal holder can include a plurality of partition walls including an inner partition wall that faces the bobbin, an outer partition wall that is spaced apart from the inner partition wall in a radial direction of the stator, and a plurality of middle partition walls that are disposed between the outer partition wall and the inner partition wall and define the plurality of insertion grooves. The plurality of conductive plates can include a U-phase conductive plate, a V-phase conductive plate, a W-phase conductive plate, and an N-phase conductive plate that each include connection portions configured to connect to the coil, where each of the plurality of middle partition walls and the inner partition wall defines a three-phase terminal groove configured to receive one of the connection portions of the U-phase conductive plate, the V-phase conductive plate, or the W-phase conductive plate. The inner partition wall can further define a neutral terminal groove that receives the connection portion of the N-phase conductive plate.

In some implementations, the insulating protrusion can be disposed at a first end portion of at least one of the plurality of middle partition walls or the outer partition wall, and the insulating groove can be defined at a second end portion of the at least one of the plurality of middle partition walls or the outer partition wall.

In some implementations, since the split-core assembly includes a split core, a bobbin, a coil, and a terminal holder and the terminal holder has an insulating protrusion that protrudes along a certain surface crossing the central axis of a stator, when two split-core assemblies are coupled to each other, it can be possible to effectively and stably shield between the split core and the conductive plate.

In some implementations, since the terminal holder has a bottom plate, an insulating protrusion, and an insulating groove, and when two split-core assemblies are coupled to each other, the insulating protrusion of any one terminal holder is seated in the insulating groove of the other terminal holder, it can be possible to effectively and stably overlap the terminal holders and shield between the split core and the conductive plates.

In some implementations, a plurality of insulating protrusions are formed at one terminal holder and protrude from a bottom plate and each partition wall and the number and shape of insulating grooves correspond to those of the insulating protrusions, so insulation between the conductive plate, insulation between the conductive plates and the split core, and coupling of terminal holders can be stably made.

In some implementations, the protruding degree of the insulating protrusion is increased as it goes away from the central axis of the stator, it can be possible to more effectively prevent a gap between two terminal holders.

In some implementations, since the coil and the conductive plates are connected in the space between the outer flange and the inner partition wall, it can be possible to provide a stator and a split-core assembly in which the wires between the coil and the conductive plates are not exposed over the bobbin and the terminal holder.

DETAILED DESCRIPTION

Figure 1:
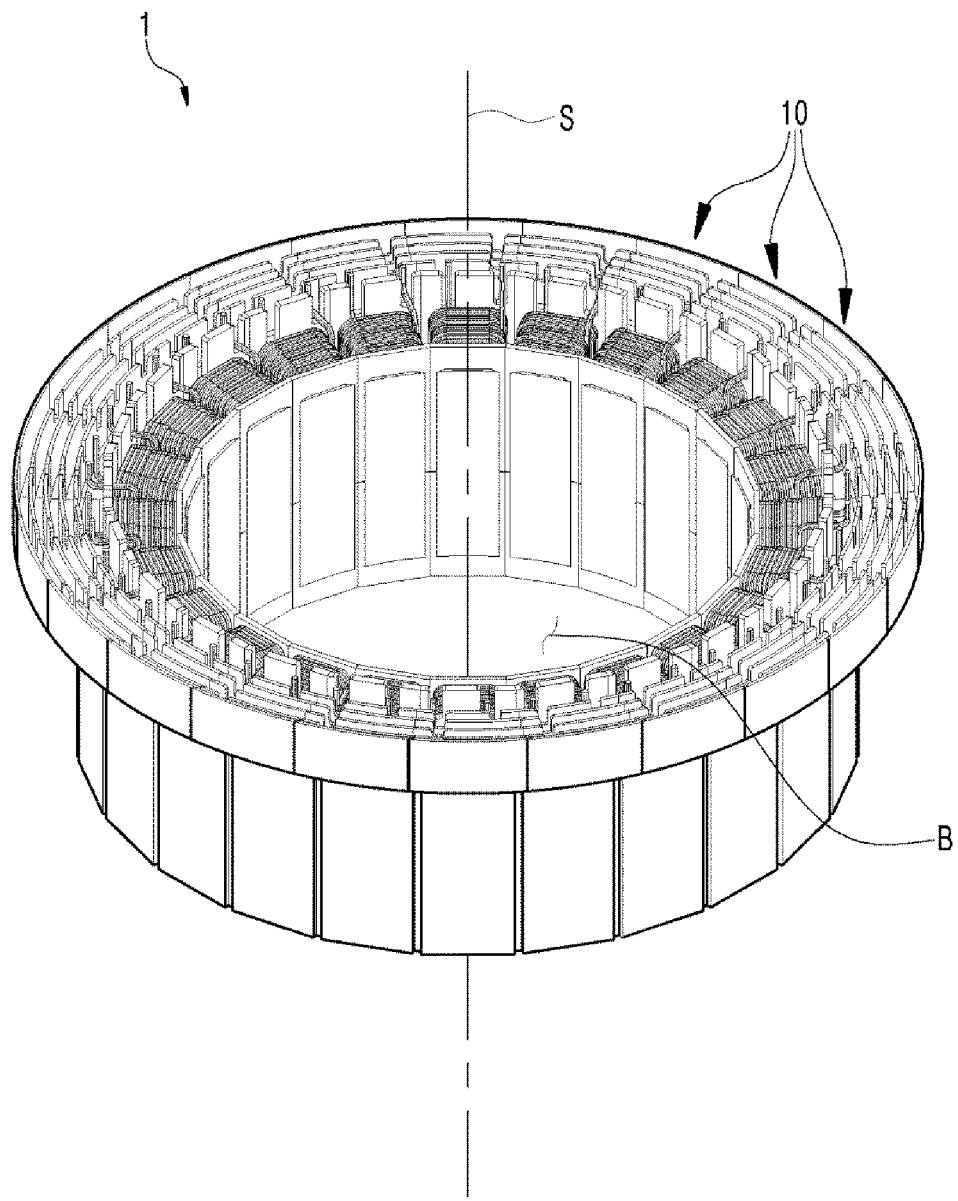
FIG. 1 is a perspective view showing an example of a stator including a plurality of split-core assemblies.

Hereafter, one or more implementations of the present disclosure are described in detail with reference to the accompanying drawings to describe the present disclosure in more detail. Like reference numerals indicate the same components throughout the detailed description.

FIG. 1 is a perspective view showing an example of a stator 1.

In some implementations, a concentrated type motor can include the stator 1, and the stator 1 can include a split-core assembly 10.

The split-core assembly 10 can include a plurality of parts. For example, the split-core assemblies 10 can be circumferentially arranged around a central axis S of the stator 1. That is, a plurality of split-core assemblies 10 can be circumferentially arranged around the central axis S. The stator 1 shown in FIG. 1 can be formed by combining the plurality of split-core assemblies 10.

In some examples, a motor including the stator 1 can be a 3-phase motor, and the number of the split-core assemblies 10 forming one stator 1 can be a multiple of 3. For example, as shown in FIG. 1, the number of the split-core assemblies 10 of one stator 1 can be 24.

In the present disclosure, the direction that is parallel with the direction of the central axis S of the stator 1 is defined as an up-down direction. The circumferential direction in the present disclosure refers to a circumferential direction around the central axis S, and the radial direction refers to the radial direction from the central axis S unless stated otherwise.

In some implementations, the plurality of split-core assemblies 10 can be arranged such that both ends are in close contact with each other in the circumferential direction. The split-core assemblies 10 can be coupled to each other by their own parts, or can be coupled to each other through other parts. As for the former, for example, the split-core assemblies 10 can be fitted or locked to each other, and as for the latter, for example, the split-core assemblies 10 can be inserted and coupled to each other in the housing of a motor.

The stator 1 to which the split-core assemblies 10 are coupled can have a ring shape. In some examples, where the stator 1 is included in a concentrated type motor, a rotor can be positioned in the central space B of the stator 1 and can be rotated about the central axis S.

Figure 2:
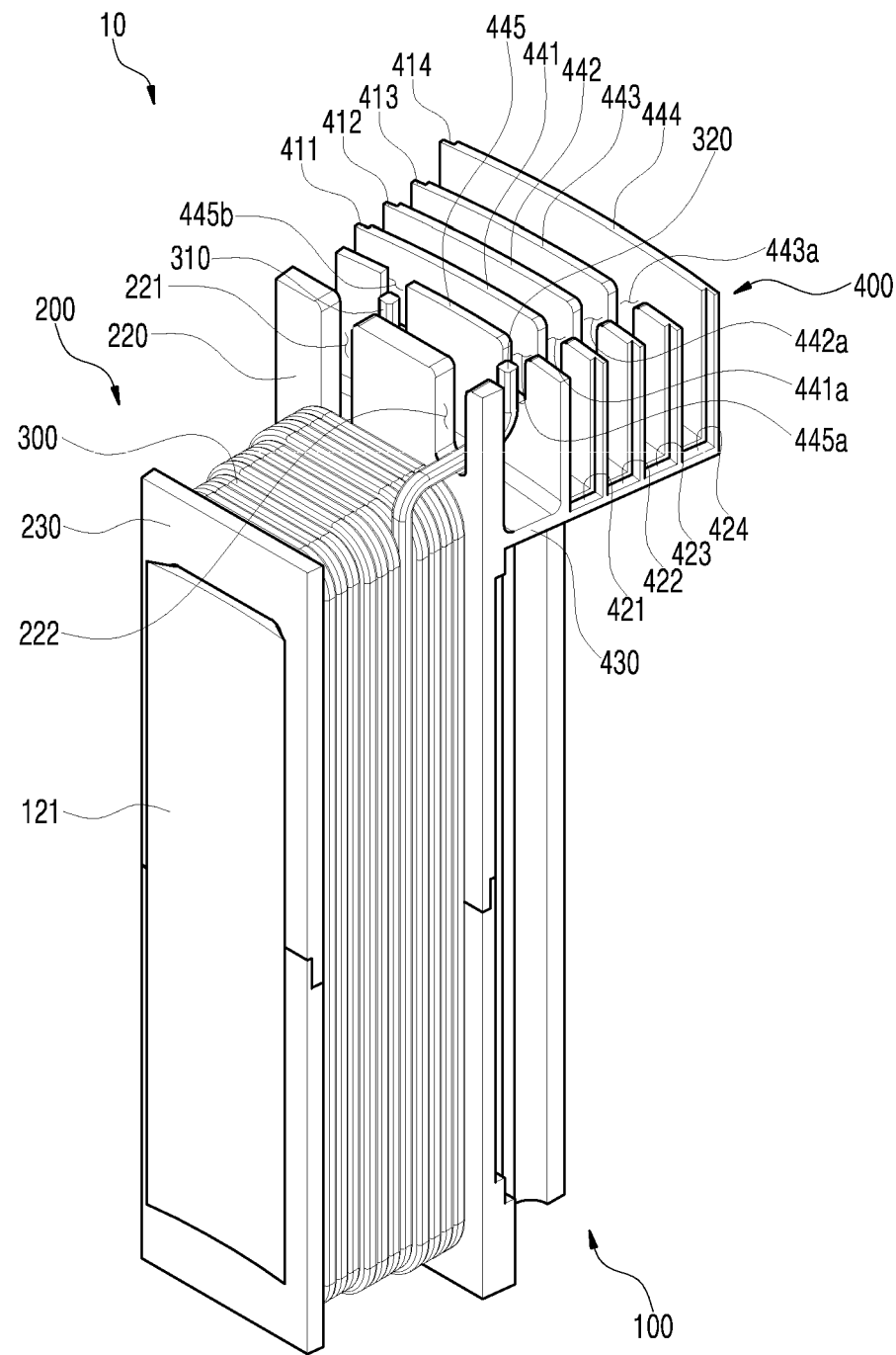
FIG. 2 is a perspective view showing an example of the split-core assembly shown in FIG. 1.
Figure 3:
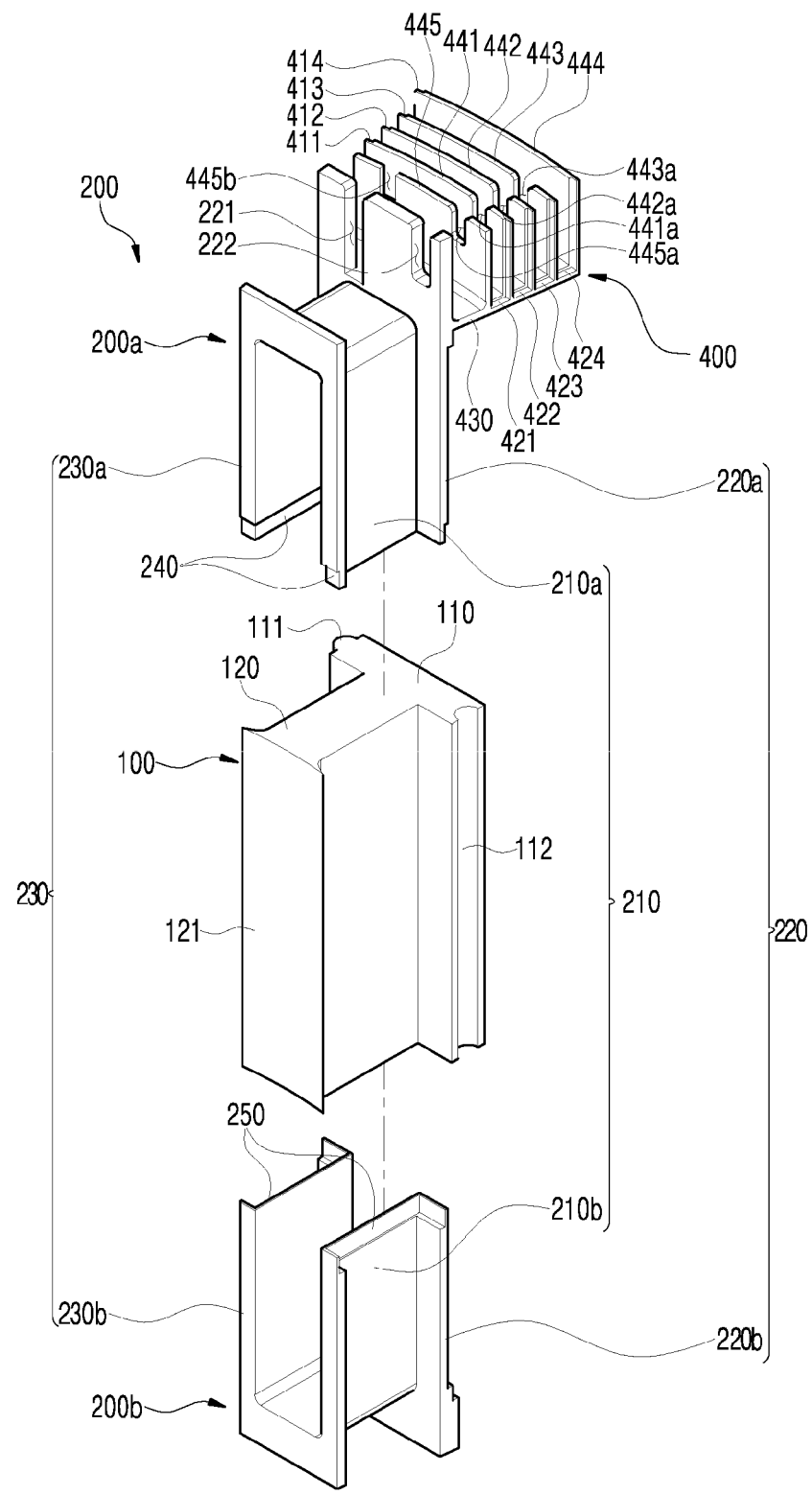
FIG. 3 is a perspective view separately showing examples of a split core, a bobbin, and a terminal holder of the split-core assembly shown in FIG. 2.
Figure 4:
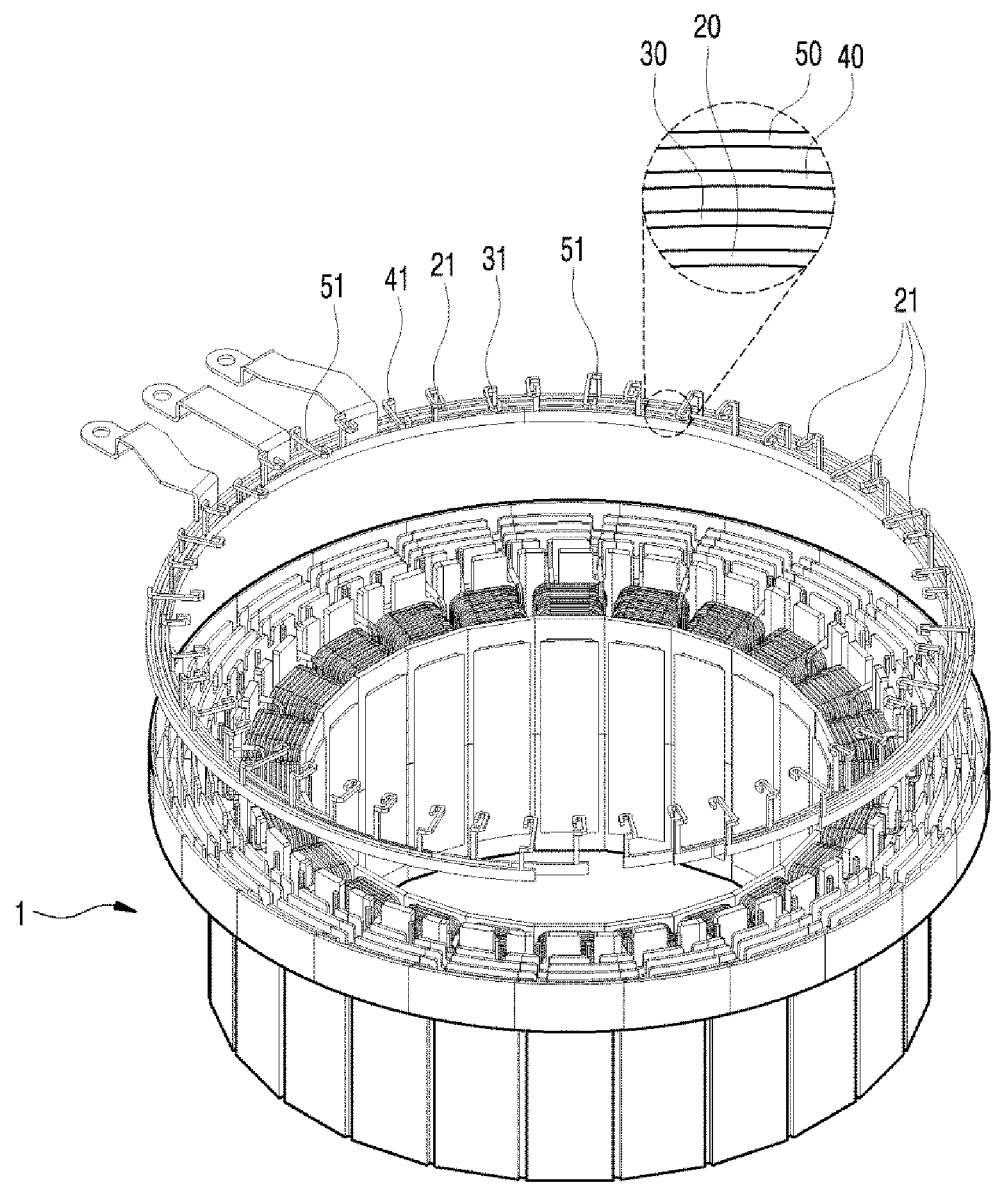
FIG. 4 is an exploded perspective view showing the stator shown in FIG. 1 and an example of conductive plates coupled to the stator.
Figure 5:
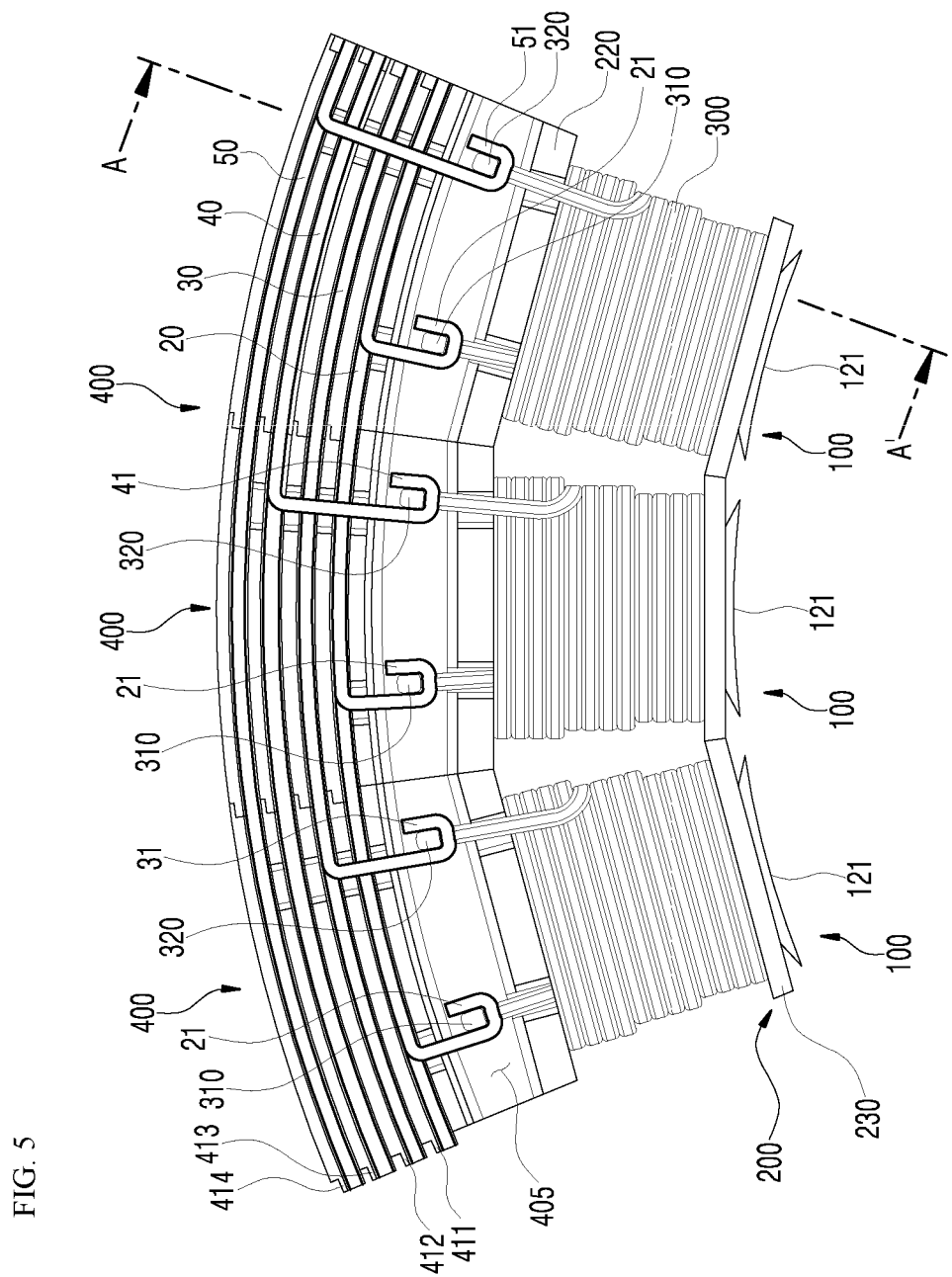
FIG. 5 is a partial enlarged plan view showing an example state in which the stator and the conductive plates are coupled.
Figure 6:
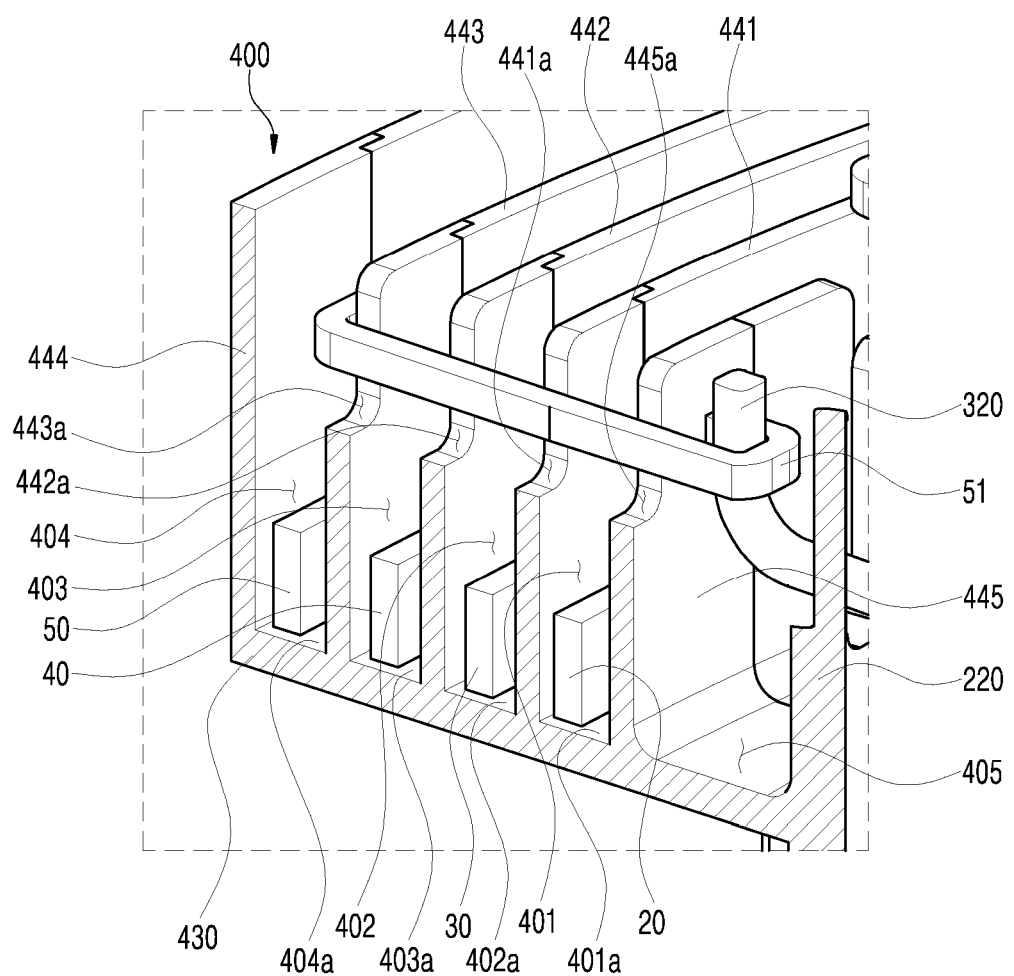
FIG. 6 is a perspective cross-sectional view taken along line A-A' of FIG. 5.

FIG. 2 is a perspective view showing the split-core assembly 10 shown in FIG. 1, FIG. 3 is a perspective view separately showing a split core 100, a bobbin 200, and a terminal holder 400 of the split-core assembly shown in FIG. 2, FIG. 4 is an exploded perspective view showing the stator 1 shown in FIG. 1 and conductive plates 20, 30, 40, and 50 coupled to the stator 1, FIG. 5 is a partial enlarged plan view showing the state in which the stator a and the conductive plates 20, 30, 40, and 50 are coupled, and FIG. 6 is a perspective cross-sectional view taken along line A-A' of FIG. 5.

The split-core assembly 10 can include a split core 100, a bobbin 200, a coil 300, and a terminal holder 400.

The split core 100 can be made of conductive metal. The split core 100 can be formed by stacking several metal plates (core plates) in the up-down direction, in which the metal plates can have the same shape and size.

The split core 100 can have a yoke 110 and a tooth 120 extending close to the central axis S from the yoke 110.

The yoke 110 is the portion that is relatively far from the central axis S and the tooth 120 is the portion that is relatively close to the central axis S. The yoke 110 has a circumferential with, as compared with the tooth 120.

The inner surface 121 of the tooth 120 can be a curved surface and faces the central axis S of the stator 1.

When split-core assemblies 10 are coupled to each other, any one split core 100 and the other split core 100 can be in close contact with each other, and in this case, the yokes 110 of the split cores 100 can be in close contact with each other.

In order to stably bring the split cores 100 in close contact with each other and in order to stably couple the split cores 100, a protrusion 111 that circumferentially protrudes can be formed on any one side of the yoke 110 and a concave groove 112 can be formed on the other side so that the protrusion 111 is inserted therein. The protrusion 111 and the groove 112 can be fitted to each other. That is, the protrusion 111 and the groove 112 can be located at opposite sides in the circumferential direction and can have corresponding shapes and sizes (see FIG. 3).

The bobbin 200 can be made of an insulator and can be coupled to the outer side of the split core 100. The bobbin 200 can be made of plastic. The bobbin 200 can surround at least a portion of the tooth 120.

The bobbin 200 is provided for insulation between the split core 100 and a coil 300 when the coil 300 is wound around the split core 100. The bobbin 200 is positioned between the split core 100 and the coil 300 and surrounds the tooth 120 of the split core 100. The bobbin 200 can be formed in a tube shape, and in this case, the axis thereof can be defined in the radial direction of the stator 1.

In some implementations, the bobbin 200 can have a winding portion 210, an outer flange 220, and an inner flange 230.

The coil 300 can be wound on the outer surface of the winding portion 210.

The winding portion 210 can be formed in a tube shape, and in this case, the axis of the winding portion 210 can face the radial direction of the stator 1, and the cross-section of the winding portion 210 can be a rectangle.

The outer flange 220 can be integrated with the winding portion 210 and formed such that the diameter increases at a position that is farther from the central axis S than the winding portion 210. That is, the outer flange 220 is formed such that the edge opens outward at the winding portion 210. The outer flange 220 can form the outer end of the bobbin 200 in the radial direction of the stator 1. The outer flange 220 can form the boundary of the region in which the coil 300 is wound when the coil 300 is wound on the winding portion 210.

In the split-core assemblies 10 and the stator 1, the outer flange 220 can be integrated with the terminal holder 400. That is, the terminal holder 400 can be integrated with the bobbin 200.

The inner flange 230 can be integrated with the winding portion 210 and formed such that the diameter increases at a position that is closer to the central axis S than the winding portion 210. That is, the inner flange 230 is formed such that the edge opens outward at the winding portion 210. The inner flange 230 can form an end of the bobbin 200 at the opposite side to the outer flange 220. That is, the inner flange 230 can form the inner end of the bobbin 200 in the radial direction of the stator 1. The inner flange 230 can form the boundary of the region in which the coil 300 is wound when the coil 300 is wound on the winding portion 210.

A first groove 221 and a second groove 222 can be formed at the upper portion of the outer flange 220.

The first groove 221 is formed to be concave downward from the upper end of the outer flange 220 and the outer flange 220 is radially pierced by the first groove 221. An end 310 of the coil 300 to which A connection portion 21 of an N-phase conductive plate 20 of the conductive plates is coupled is inserted in the first groove 221.

The second groove 222 is spaced apart from the first groove 221 and is formed to be concave downward from the upper end of the outer flange 220, and the outer flange 220 is pierced by the second groove 222. An end 320 of the coil 300 that is coupled to one of a connection portion 31 of a U-phase conductive plate 30, a connection portion 42 of a V-phase conductive plate 40, and a connection portion 51 of a W-phase conductive plate 50 is inserted in the second groove 222.

In some implementations, the bobbin 200 can include a first bobbin 200a and a second bobbin 200b.

The first bobbin 200a is a part coupled to the upper portion of the tooth 120 and the second bobbin 200b is a part coupled to the lower portion of the tooth 120. The second bobbin 200b is coupled to the first bobbin 200a, thereby surrounding the tooth 120.

The first bobbin 200a has a first winding portion 210a, a first outer flange 220a, and a first inner flange 230a.

The first winding portion 210a, which is the portion on which the coil 300 is wound, forms the upper portion of the winding portion 210.

The first outer flange 220a is formed such that the diameter increases at a position farther from the central axis S than the first winding portion 210a, and forms the upper portion of the outer flange 220.

In some implementations, when the bobbin 200 is divided into the first bobbin 200a and the second bobbin 200b, the first groove 221 and the second groove 222 can be formed at the first outer flange 220a.

The first inner flange 230a is formed such that the diameter increases at a position closer to the central axis S than the first winding portion 210a, and forms the upper portion of the inner flange 230.

The second bobbin 200b can have a second winding portion 210b, a second outer flange 220b, and a second inner flange 230b.

The second winding portion 210b, which is the portion on which the coil 300 is wound, forms the lower portion of the winding portion 210.

The second outer flange 220b is formed such that the diameter increases at a position farther from the central axis S than the second winding portion 210b, and forms the lower portion of the outer flange 220.

The second inner flange 230b is formed such that the diameter increases at a position closer to the central axis S than the second winding portion 210b, and forms the lower portion of the inner flange 230.

The lower portion of the first bobbin 200a and the upper portion of the second bobbin 200b can be formed such that any one thereof is fitted in the other one. That is, the lower portion of the first bobbin 200a and the upper portion of the second bobbin 200b can overlap each other. The portion of the first bobbin 200a that overlaps the second bobbin 200b is a first overlap portion 240, and the portion of the second bobbin 200b that overlaps the first bobbin 200a is a second overlap portion 250. The first overlap portion 240 can be formed at the lower ends of the first winding portion 210a, the first outer flange 220a, and the first inner flange 230a, and the second overlap portion 250 can be formed at the upper ends of the second winding portion 210b, the second outer flange 220b, and the second inner flange 230b.

Accordingly, when the first bobbin 200a and the second bobbin 200b are coupled, relative movement in the circumferential direction and the radial direction between the first bobbin 200a and the second bobbin 200b is restricted, whereby they can be stably coupled.

The coil 300 is made of conductive metal and can be made of copper, and is repeatedly wound on the outer surface of the winding portion 210 of the bobbin 200. A first end 310 that is any one end of the coil 300 can be fitted in the first groove 221 of the outer flange 220 and positioned toward the terminal holder 400. Further, a second end 320 that is the other end of the coil 300 can be fitted in the second groove 222 of the outer flange 220 and positioned toward the terminal holder 400.

In some implementations, the terminal holder 400 can be made of an insulator. In some examples, the terminal holder 400 can be integrated with the bobbin 200. When the bobbin 200 is divided into the first bobbin 200a and the second bobbin 200b, the terminal holder 400 can be integrated with the first bobbin 200a. In some examples, the terminal holder 400 can be at least partially disposed on the yoke 110.

A plurality of insertion grooves 401, 402, 403, and 404 in which the plurality of conductive plates 20, 30, 40, and 50 electrically connected to the coil 300 are inserted, respectively, can be sequentially formed at the terminal holder 400.

A motor including the split-core assemblies 10 and the stator 1 can be a 3-phase motor, and in this case, the conductive plates 20, 30, 40, and 50 and the coil 300 can be connected to make Y-wiring.

The conductive plates 20, 30, 40, and 50 coupled to the stator 1 can be four conductive plates. The N-phase conductive plate 20 that forms a neutral point, and the U-phase conductive plate 30, V-phase conductive plate 40, and W-phase conductive plate 50 that form 3 phases each can be connected to the terminal holder 400. The four conductive plates 20, 30, 40, and 50 can be coaxially arranged (around the central axis S).

Four insertion grooves 401, 402, 403, and 404 can be formed at the terminal holder 400 such that the four conductive plates 20, 30, 40, and 50 are inserted therein, respectively. The insertion grooves 401, 402, 403, and 404 are narrow and long grooves and are elongated in the circumferential direction of the stator 1.

The terminal holder 400 has a plurality of partition walls 441, 442, 443, 444, and 445 spaced apart from each other to form the insertion grooves 401, 402, 403, and 404.

In some implementations, the partition walls 441, 442, 443, 444, and 445 can be radially spaced apart from each other. That is, the partition walls 441, 442, 443, 444, and 445 can be spaced apart from each other in a direction perpendicular to the central axis S. In some implementations, the partition walls can be spaced apart from each other in a direction not perpendicular to the central axis S or can be spaced apart from each other in a direction inclined a predetermined angle from the central axis S.

It is assumed in the following description that the partition walls 441, 442, 443, 444, and 445 are spaced apart from each other in a radial direction of the central axis S.

The terminal holder 400 has a bottom plate 430 and a plurality of partition walls 441, 442, 443, 444, and 445 such that the insertion grooves 401, 402, 403, and 404 can be formed.

The bottom plate 430 connects the lower ends of the plurality of partition walls 441, 442, 443, 444, and 445 to each other. The bottom plate 430 can form the innermost surfaces of the insertion grooves 401, 402, 403, and 404, and the top of the bottom plate 430 can be the bottoms 401a, 402a, 403a, and 404a of the insertion grooves 401, 402, 403, and 404.

The bottom plate 430 can form a portion of a fan shape in a plane. That is, the bottom plate 430 can be formed such that the circumferential width increases as it goes away from the central axis S, and both edges of the bottom plate 430 can be arranged in the radial direction of the stator 1.

The terminal holder 400 has five partition walls 441, 442, 443, 444, and 445 to form the four insertion grooves 401, 402, 403, and 404.

The four insertion grooves 401, 402, 403, and 404 can be formed in the radial direction of the stator 1, can form a portion of a coaxial circle, and can be spaced apart from each other with the same intervals by the partition walls 441, 442, 443, 444, and 445.

The insertion grooves 401, 402, 403, and 404 of the terminal holder 400 are open upward, and the conductive plates 20, 30, 40, and 50 are inserted downward in the insertion grooves 401, 402, 403, and 404.

The up-down heights of the partition walls 441, 442, 443, 444, and 445 (the up-down heights of the insertion grooves 401, 402, 403, and 404) are larger than the up-down heights of the conductive plates 20, 30, 40, and 50.

The partition walls 441, 442, 443, 444, and 445 can be formed such that the widths (circumferential lengths) thereof are sequentially increased as they go away from the central axis S.

The partition walls 441, 442, 443, 444, and 445 can be formed circumferentially throughout the entire region of the bottom plate 430. That is, the circumferential lengths of the partition walls 441, 442, 443, 444, and 445 can be the same as the circumferential length of the bottom plate 430 at the positions where the partition walls 441, 442, 443, 444, and 445 are connected.

The partition walls can be classified into middle partition walls 441, 442, and 443, an outer partition wall 444, and an inner partition wall 445. That is, the terminal holder 400 can have middle partition walls 441, 442, and 443, an outer partition wall 444, and an inner partition wall 445.

The middle partition walls 441, 442, and 443 form the boundaries of the plurality of insertion grooves 401, 402, 403, and 404, and can be provided as a plurality of pieces. When four insertion grooves 401, 402, 403, and 404 are provided, three middle partition walls 441, 442, and 443 are provided. The middle partition walls 441, 442, and 443 can all have the same height.

The outer partition wall 444 can be farther from the ends 310 and 320 of the coil 300 than the middle partition walls 441, 442, and 443, and can be spaced apart from the middle partition walls 441, 442, and 443.

The outer partition wall 444 can be positioned outside the middle partition wall 443 (far from the central axis S) which is farthest from the central axis S in the radial direction. The height of the outer partition wall 444 can be larger than the height of the middle partition walls 441, 442, and 443.

The inner partition wall 445 can be closer to the ends 310 and 320 of the coil 300 than the middle partition walls 441, 442, and 443, and can be spaced apart from the middle partition walls 441, 442, and 443.

The inner partition wall 445 can be positioned inside the middle partition wall 441 (close to the central axis S) which is closest to the central axis S in the radial direction. The height of the inner partition wall 445 can be the same as the height of the middle partition walls 441, 442, and 443.

In some implementations, 3-phase terminal grooves 441a, 442a, 443a, and 445a can be formed at the middle partition walls 441, 442, and 443 and the inner partition wall 445. The 3-phase terminal grooves 441a, 442a, 443a, and 445a can be formed downward from the upper ends of the middle partition walls 441, 442, and 443 and the inner partition wall 445. The upper portions of the middle partition walls 441, 442, and 443 and the inner partition wall 445 are radially pierced by the 3-phase terminal grooves 441a, 442a, 443a, and 445a.

The length (height) from the lower ends of the 3-phase terminal grooves 441a, 442a, 443a, and 445a to the top (the bottoms 401a, 402a, 403a, and 404a) of the bottom plate 430 can be larger than or the same as the up-down length (height) of the 3-phase terminal grooves 441a, 442a, 443a, and 445a.

The 3-phase terminal grooves 441a, 442a, 443a, and 445a can be arranged straight at the terminal holder 400.

The connection portion 31 of the U-phase conductive plate 30, the connection portion 41 of the V-phase conductive plate 40, and the connection portion 51 of the W-phase conductive plate 50 are individually fitted in the 3-phase terminal grooves 441a, 442a, 443a, and 445a, respectively.

In some implementations, a neutral terminal groove 445b can be defined at the inner partition wall 445. For example, the neutral terminal groove 445b can be recessed downward from the upper end of the inner partition wall 445. The upper portion of the inner partition wall 445 is radially pierced by the neutral terminal groove 445b.

The length (height) from the lower end of the neutral terminal groove 445b to the top (the bottoms 401a, 402a, 403a, and 404a) of the bottom plate 430 can be larger than or the same as the up-down length (height) of the neutral terminal groove 445b.

The connection portion 21 of the N-phase conductive plate 20 is fitted in the neutral terminal groove 445b.

In some implementations, when the inner partition wall 445, the middle partition walls 441, 442, and 443, and the outer partition wall 444 are formed in the radial direction of the stator 1, the upper end of the outer flange 220 can be higher than the upper ends of the middle partition walls 441, 442, and 443 and the inner partition wall 445, and the gap between the outer flange 220 and the inner partition wall 445 can be larger than the gaps between the partition walls 441, 442, 443, 444, and 445.

In some implementations, the ends 310 and 320 of the coil 300 and the connection portions 21, 31, 42, and 51 of the conductive plates 20, 30, 40, and 50 can be easily coupled in a space 405 between the outer flange 220 and the inner partition wall 445. In some examples, the ends 310 and 320 of the coil 300 and the connection portions 21, 31, 42, and 51 of the conductive plates 20, 30, 40, and 50 can be coupled without being exposed over the upper ends of the bobbin 200 and the terminal holder 400. In some examples, the connection portions 21, 31, 42, and 51 can include a strip or bar of a conductor that includes an end hook connected to the end 320 of the coil 300.

Figure 7A:
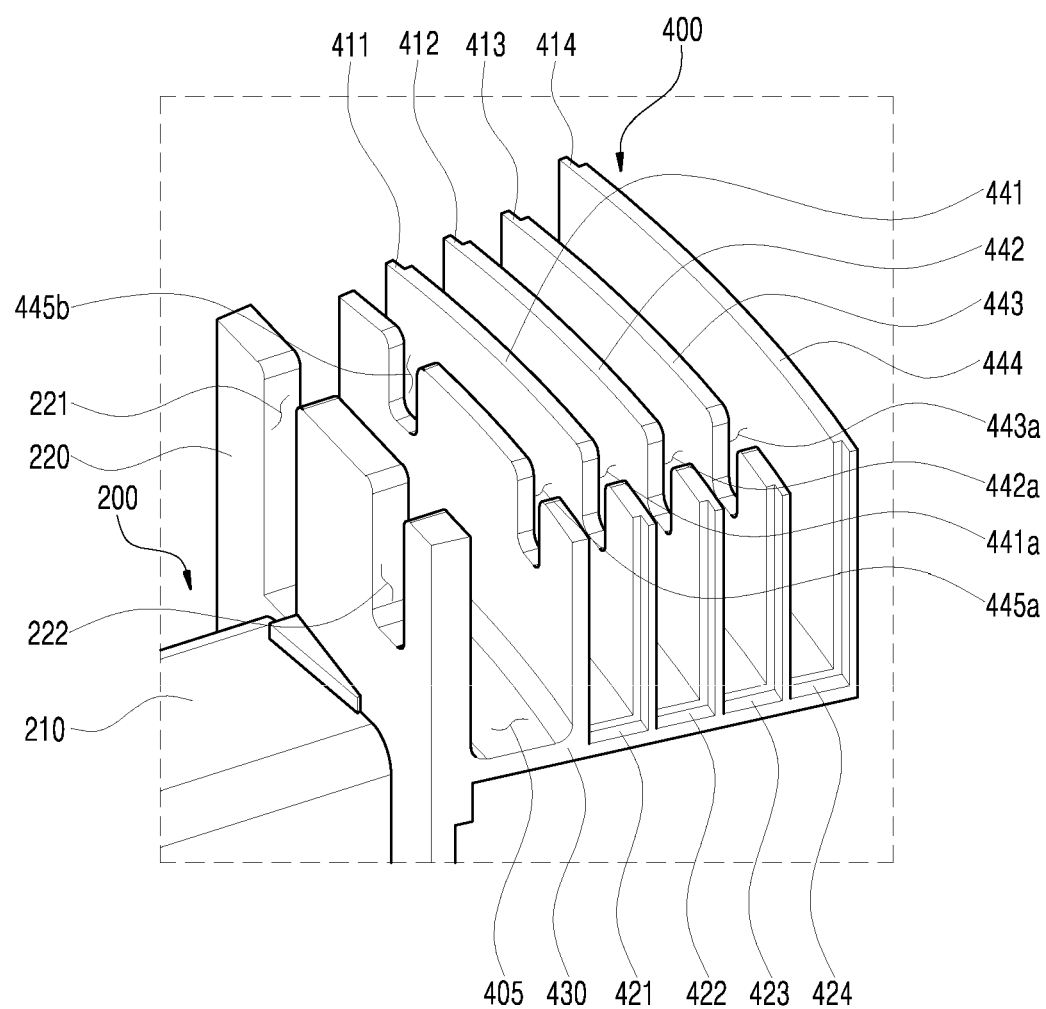
FIG. 7A is an enlarged perspective view showing an example portion of the bobbin and the terminal holder shown in FIG. 3.
Figure 7B:
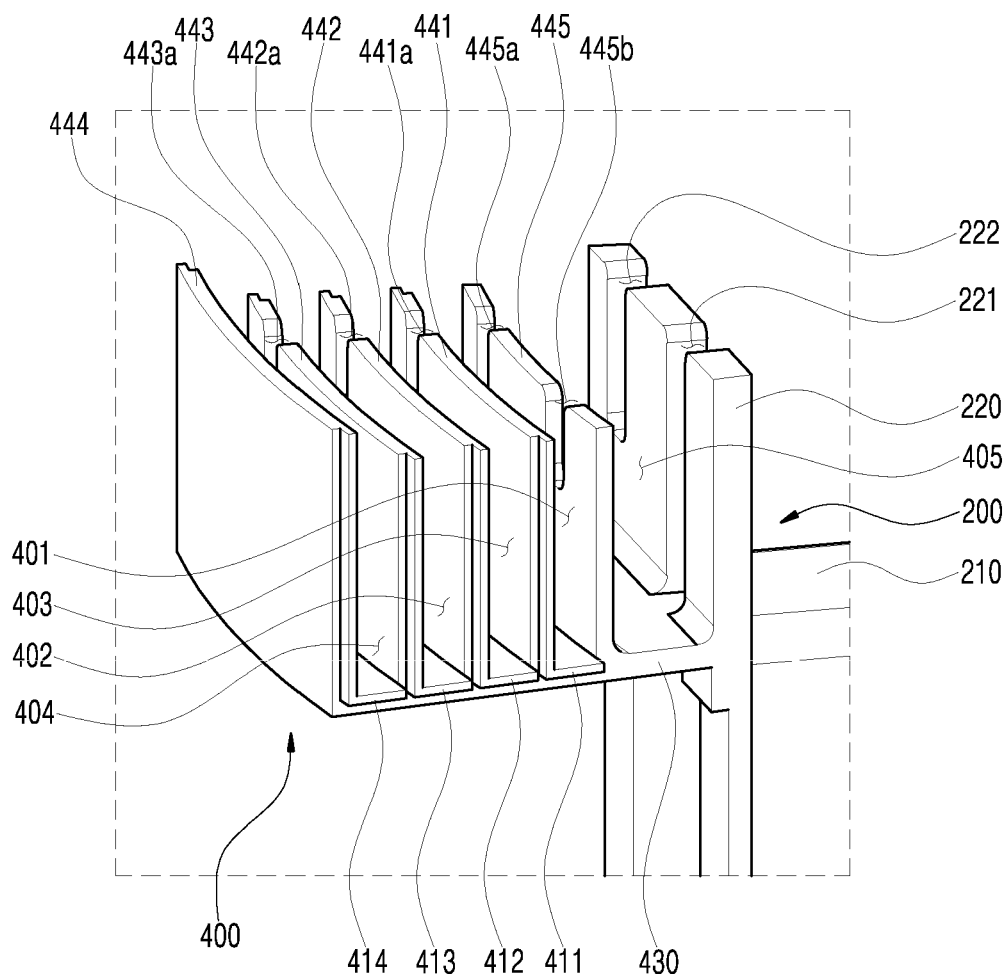
FIG. 7B is a perspective view showing the portion of the bobbin and the terminal holder shown in FIG. 7A in another direction.
Figure 8:
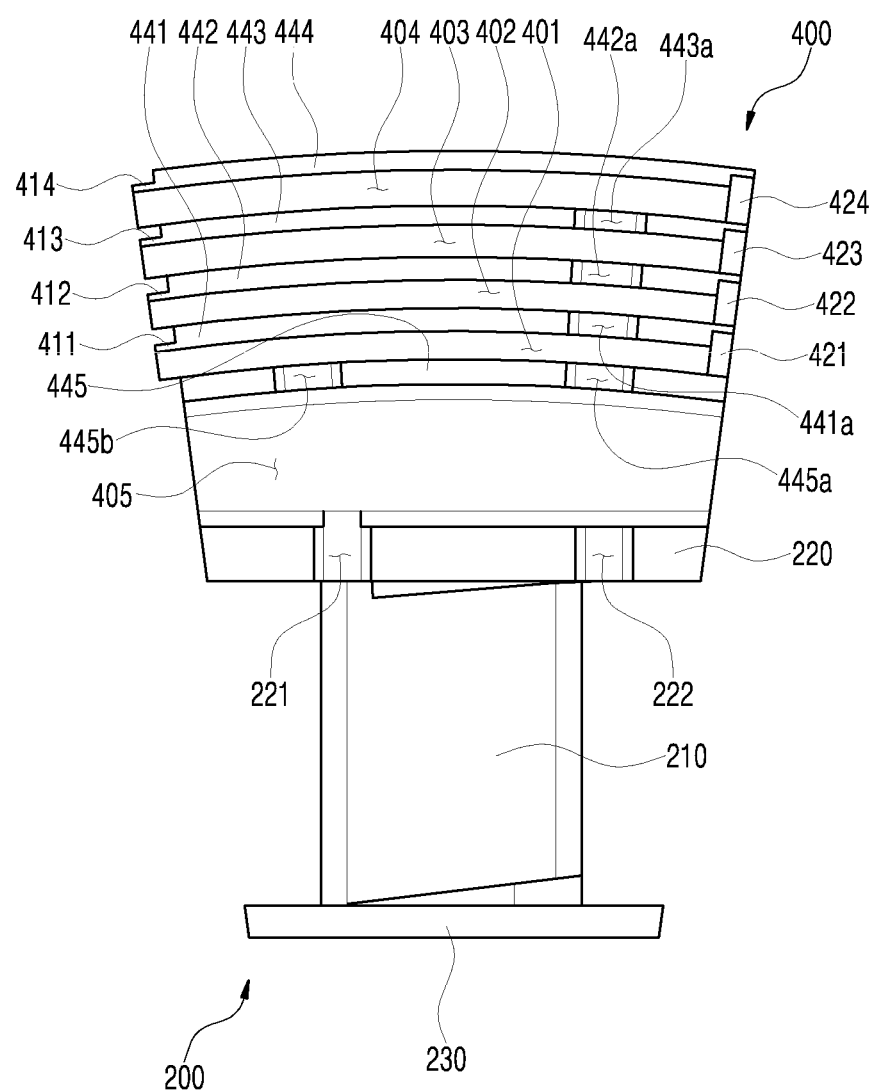
FIG. 8 is a plan view showing the bobbin and the terminal holder shown in FIG. 3.

FIG. 7A is an enlarged perspective view showing a portion of the bobbin 200 and the terminal holder 400 shown in FIG. 3, FIG. 7B is a perspective view showing the portion of the bobbin 200 and the terminal holder 400 shown in FIG. 7A in another direction, and FIG. 8 is a plan view showing the bobbin 200 and the terminal holder 400 shown in FIG. 3.

In some implementations, insulating protrusions 411, 412, 413, and 414 can be integrally formed at the terminal holder 400. In some implementations, insulating grooves 421, 422, 423, and 424 can be formed at the terminal holder 400.

The insulating protrusions 411, 412, 413, and 414 can protrude toward a certain surface crossing the central axis S, at the terminal holder 400.

The insulating protrusions 411, 412, 413, and 414 can protrude in the circumferential direction of the terminal holder 400.

Accordingly, in some implementations, when two terminal holders 400 are coupled to each other, the insulating protrusions 411, 412, 413, and 414 of any one terminal holder 400 can overlap the other terminal holder 400, and it can be possible to shield between the split core 100 and the conductive plates 20, 30, 40, and 50.

The insulating protrusions 411, 412, 413, and 414 can protrude in the circumferential direction of the stator 1 from an end of the bottom plate 430. The insulating protrusions 411, 412, 413, and 414 can protrude in the circumferential direction of the stator 1 from an end of any one or more of the partition walls 441, 442, 443, 444, and 445. Since the insulating protrusions 411, 412, 413, and 414 protrude from the bottom plate 430 and any one of the partition walls 441, 442, 443, 444, and 445, the insulating protrusions 411, 412, 413, and 414 can have a ⌐ or ⌙ shape, e.g., an L shape. That is, the cross-section of the insulating protrusions 411, 412, 413, and 414 can have a ⌐ or ⌙ shape, e.g., an L shape.

The insulating protrusions 411, 412, 413, and 414 can be formed at the insertion grooves 401, 402, 403, and 404, respectively. In this case, the insulating protrusions 411, 412, 413, and 414 can be formed radially throughout the insertion grooves 401, 402, 403, and 404 and can be formed throughout the insertion grooves 401, 402, 403, and 404 in the up-down direction.

Since the insulating protrusions 411, 412, 413, and 414 are formed at the insertion grooves 401, 402, 403, and 404, respectively, when four insertion grooves 401, 402, 403, and 404 are provided, four insulating protrusions 411, 412, 413, and 414 can be provided. When a plurality of insulating protrusions 411, 412, 413, and 414 are provided at one terminal holder 400, the insulating protrusions 411, 412, 413, and 414 can be formed in the same shape.

The thickness of the insulating protrusions 411, 412, 413, and 414 can be smaller than the thicknesses of the bottom plate 430 and the partition walls 441, 442, 443, 444, and 445. For example, the thickness of the insulating protrusions 411, 412, 413, and 414 can be about ½ of the thicknesses of the bottom plate 430 and the partition walls.

The insulating grooves 421, 422, 423, and 424 are formed opposite the insulating protrusions 411, 412, 413, and 414 at the terminal holder 400. That is, at the terminal holder 400, the insulating grooves 421, 422, 423, and 424 and the insulating protrusions 411, 412, 413, and 414 are formed at both circumferential ends.

The insulating grooves 421, 422, 423, and 424 can be concave grooves or stepped grooves formed at an end of the bottom plate 430.

In some implementations, when two terminal holders 400 are coupled to each other, the insulating protrusions 411, 412, 413, and 414 of any one terminal holder 400 can be seated in the insulating grooves 421, 422, 423, and 424 of the other terminal holder 400.

The insulating grooves 421, 422, 423, and 424 can be formed to be concave and can be stepped in the circumferential direction of the stator 1 at a circumferential end of the partition walls. Since the insulating grooves 421, 422, 423, and 424 are formed at the bottom plate 430 and any one of the partition walls 441, 442, 443, 444, and 445, the insulating grooves 421, 422, 423, and 424 can make a ⌐ or ⌙ shape, e.g., an L shape. The insulating grooves 421, 422, 423, and 424 can have a shape and a size that correspond to those of the insulating protrusions 411, 412, 413, and 414.

The insulating grooves 421, 422, 423, and 424 may be formed at the insertion grooves 401, 402, 403, and 404, respectively. In this case, the insulating grooves 421, 422, 423, and 424 may be formed radially throughout the insertion grooves 401, 402, 403, and 404 and can be formed throughout the insertion grooves 401, 402, 403, and 404 in the up-down direction.

Since the insulating grooves 421, 422, 423, and 424 are formed at the insertion grooves 401, 402, 403, and 404, respectively, when four insertion grooves 401, 402, 403, and 404 are provided, four insulating grooves 421, 422, 423, and 424 are provided. When a plurality of insulating grooves 421, 422, 423, and 424 are provided at one terminal holder 400, the insulating grooves 421, 422, 423, and 424 may be formed in the same shape.

As described above, the terminal holder 400 has the bottom plate 430, the insulating protrusions 411, 412, 413, and 414, and the insulating grooves 421, 422, 423, and 424. Further, when two split-core assemblies 10 are coupled to each other, the insulating protrusions 411, 412, 413, and 414 of any one terminal holder 400 are inserted or seated in the insulating grooves 421, 422, 423, and 424 of the other terminal holder 400. Accordingly, it is possible to effectively and stably overlap the terminal holders 400 and shield between the split core 100 and the conductive plates 20, 30, 40, and 50.

Figure 9:
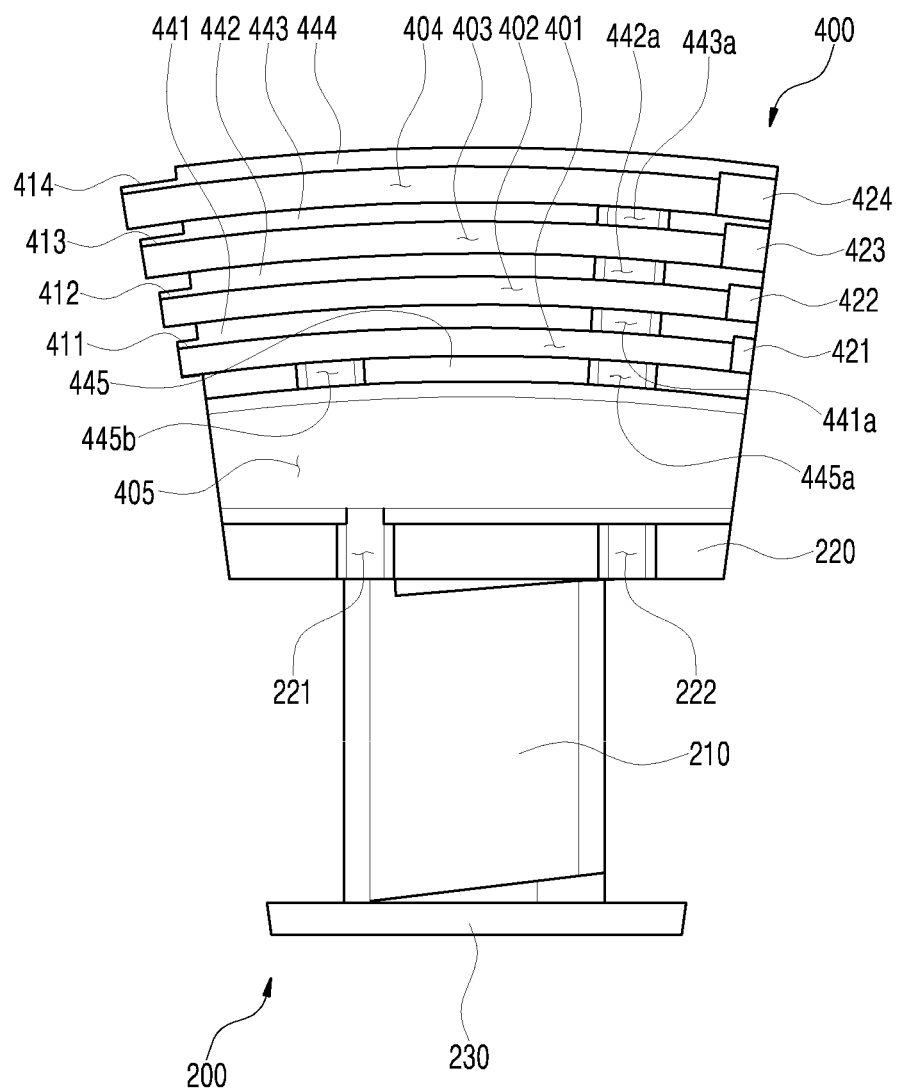
FIG. 9 is a plan view showing an example of a bobbin and a terminal holder.

FIG. 9 is a plan view showing an example of a bobbin 200 and a terminal holder 400.

In some implementations, the protruding degrees (e.g., circumferential lengths) of the insulating protrusions 411, 412, 413, and 414 can be increased as they go away from the central axis S.

When a plurality of insulating protrusions 411, 412, 413, and 414 are formed at one terminal holder 400, the insulating protrusions 411, 412, 413, and 414 that are relatively far from the central axis S can further protrude than the insulating protrusions 411, 412, 413, and 414 that are relatively close to the central axis S.

In this case, the insulating grooves 421, 422, 423, and 424 can also formed to corresponding to the protruding degrees of the insulating protrusions 411, 412, 413, and 414, respectively.

When a plurality of split-core assemblies 10 are circumferentially coupled to each other, the gap between the terminal holders 400 can be increased as it goes away from the central axis S. In some examples, the protruding degrees of the insulating protrusions 411, 412, 413, and 414 are increased as they go away from the central axis S, to thereby effectively reduce or prevent a gap between the terminal holders 400.

Although a specific implementation of the present disclosure was described above with reference to drawings, the present disclosure is not limited thereto and it should be understood that the present disclosure can be changed and modified by those skilled in the art in various ways through more detailed implementations without departing from the spirit and scope of the present disclosure. Accordingly, the range of the present disclosure should be defined not by the implementations described above, but by the spirit described in claims.

In the split-core assembly and a stator including the split-core assembly, insulating protrusions are formed at a terminal holder, and when two split-core assemblies are coupled to each other, the insulating protrusions of any one terminal holder overlap the other terminal holder. Accordingly, it can be possible to prevent or reduce a gap between the split-core assemblies, and the present disclosure has sufficient industrial applicability because a portion between the split core and the conductive plates is shielded.

The invention claimed is:

1. A split-core assembly of a stator of a motor, the stator including a plurality of split-core assemblies that are arranged circumferentially about a central axis of the stator, the split-core assembly comprising:
    a split core comprising a yoke and a tooth, the tooth extending from the yoke toward the central axis of the stator;
    a bobbin made of an insulator and coupled to an outer surface of the tooth;
    a coil wound around the bobbin; and
    a terminal holder made of an insulator and disposed on or above the yoke in an up-down direction along the central axis, the terminal holder defining a plurality of insertion grooves that are spaced apart from one another in a radial direction of the stator and configured to receive downward a plurality of conductive plates electrically connected to the coil,
    wherein the terminal holder comprises an insulating protrusion that protrudes from at least one surface of the terminal holder in a circumferential direction of the stator,
    wherein the terminal holder is coupled to an adjacent terminal holder of another split-core assembly among the plurality of split-core assemblies, the insulating protrusion overlapping with the adjacent terminal holder to thereby shield the split core from the plurality of conductive plates,
    wherein the terminal holder further comprises a plurality of partition walls comprising:
        a plurality of middle partition walls that define boundaries of the plurality of insertion grooves, and
        an inner partition wall that is located closer to an end of the coil than the plurality of middle partition walls and spaced apart from the plurality of middle partition walls,
    wherein each of the plurality of middle partition walls and the inner partition wall defines a three-phase terminal groove arranged in a straight line, and
    wherein the inner partition wall further defines a neutral terminal groove.

2. The split-core assembly of claim 1, wherein the insulating protrusion is disposed at each of the plurality of insertion grooves.

3. The split-core assembly of claim 2, wherein the terminal holder further comprises a plurality of insulating protrusions that protrude from the at least one surface of the terminal holder in the circumferential direction of the stator and that are arranged in the radial direction of the stator, wherein the insulating protrusion is one of the plurality of insulating protrusions, and
    wherein circumferential lengths of the plurality of insulating protrusions in the circumferential direction increase based on radial distances of the plurality of insulating protrusions away from the central axis.

4. The split-core assembly of claim 1, wherein the plurality of partition walls further comprise
    an outer partition wall that is located farther from the end of the coil than the plurality of middle partition walls and spaced apart from the plurality of middle partition walls;
    wherein the plurality of conductive plates comprise a U-phase conductive plate, a V-phase conductive plate, a W-phase conductive plate, and an N-phase conductive plate that each include connection portions configured to connect to the coil,
    wherein the three-phase terminal groove is configured to receive one of the connection portions of the U-phase conductive plate, the V-phase conductive plate, or the W-phase conductive plate, and
    wherein the neutral terminal groove is configured to receive the connection portion of the N-phase conductive plate.

5. The split-core assembly of claim 4, wherein the bobbin comprises:
    a winding portion around which the coil is wound;
    an outer flange that is disposed radially outward relative to the winding portion and protrudes from an outer edge of the winding portion, the outer flange being coupled to the terminal holder; and
    an inner flange that is disposed radially inward relative to the winding portion and protrudes from an inner edge of the winding portion, and
    wherein the outer flange defines:
        a first groove that receives a first end of the coil coupled to the connection portion of the N-phase conductive plate, the first groove being defined at an upper portion of the outer flange, and
        a second groove that that receives a second end of the coil coupled to one of the connection portions of the U-phase conductive plate, or the V-phase conductive plate, or the W-phase conductive plate, the second groove being defined at the upper portion of the outer flange and spaced apart from the first groove.

6. The split-core assembly of claim 5, wherein the inner partition wall, the plurality of middle partition walls, and the outer partition wall are arranged in the radial direction of the stator, wherein an upper end of the outer flange is located higher than upper ends of the plurality of middle partition walls and the inner partition wall in the up-down direction, and wherein a radial gap between the outer flange and the inner partition wall is wider than a radial gap between the inner partition wall and an innermost middle partition wall among the plurality of middle partition walls.

7. The split-core assembly of claim 4, wherein the bobbin comprises a first bobbin and a second bobbin that are coupled to each other and surround the tooth, the first bobbin being coupled to an upper portion of the tooth, and the second bobbin being coupled to a lower portion of the tooth, wherein the first bobbin comprises:

a first winding portion around which an upper portion of the coil is wound, a first outer flange that is disposed radially outward relative to the first winding portion and protrudes from an outer edge of the first winding portion, the first outer flange being coupled to the terminal holder, and a first inner flange that is disposed radially inward relative to the first winding portion and protrudes from an inner edge of the first winding portion, and wherein the first outer flange defines:

a first groove that receives a first end of the coil coupled to the connection portion of the N-phase conductive plate, the first groove being defined at an upper portion of the first outer flange, and a second groove that that receives a second end of the coil coupled to one of the connection portions of the U-phase conductive plate, the V-phase conductive plate, or the W-phase conductive plate, the second groove being defined at the upper portion of the first outer flange and spaced apart from the first groove.

8. The stator comprising the plurality of split-core assemblies that include the split-core assembly of claim 1 and are circumferentially coupled to one another other.

9. A split-core assembly of a stator of a motor, the stator including a plurality of split-core assemblies that are arranged circumferentially about a central axis of the stator, the split-core assembly comprising:

a split core comprising a yoke and a tooth, the tooth extending from the yoke toward the central axis;

a bobbin made of an insulator and coupled to an outer surface of the tooth;

a coil wound around the bobbin; and a terminal holder made of an insulator and disposed on or above the yoke in an up-down direction along the central axis, the terminal holder defining a plurality of insertion grooves that are spaced apart from one another in a radial direction of the stator and configured to receive downward a plurality of conductive plates electrically connected to the coil, wherein the terminal holder comprises:

a bottom plate that defines bottoms of the plurality of insertion grooves, an insulating protrusion that protrudes from a first end of the bottom plate in a circumferential direction of the stator, and an insulating groove that is defined at a second end of the bottom plate opposite to the first end of the bottom plate, wherein the insulating protrusion is coupled to and seated in the insulating groove of another split-core assembly among the plurality of split-core assemblies located adjacent to the split-core assembly, wherein the terminal holder further comprises a plurality of partition walls comprising:

a plurality of middle partition walls that define boundaries of the plurality of insertion grooves, and an inner partition wall that is located closer to an end of the coil than the plurality of middle partition walls and spaced apart from the plurality of middle partition walls, wherein each of the plurality of middle partition walls and the inner partition wall defines a three-phase terminal groove arranged in a straight line, and wherein the inner partition wall further defines a neutral terminal groove.

10. The split-core assembly of claim 9, wherein the insulating protrusion further protrudes from at least one of plurality of partition walls in the circumferential direction of the stator such that the insulating protrusion has an L shape, and wherein the insulating groove is a stepped groove that is defined along the second end of the bottom plate and at least one of the plurality of partition walls such that the insulating groove has the L shape corresponding to the insulating protrusion.

11. The split-core assembly of claim 9, wherein the insulating protrusion and the insulating groove are disposed at each of the plurality of insertion grooves.

12. The split-core assembly of claim 11, wherein the terminal holder further comprises a plurality of insulating protrusions that protrude from the first end of the bottom plate in the circumferential direction and that are arranged in the radial direction of the stator, wherein the insulating protrusion is one of the plurality of insulating protrusions, and wherein circumferential lengths of the plurality of insulating protrusions in the circumferential direction increase based on radial positions of the plurality of insulating protrusions away from the central axis.

13. The split-core assembly of claim 9, wherein the plurality of partition walls further comprise an outer partition wall that is located farther from the end of the coil than the plurality of middle partition walls and spaced apart from the plurality of middle partition walls, wherein the plurality of conductive plates comprise a U-phase conductive plate, a V-phase conductive plate, a W-phase conductive plate, and an N-phase conductive plate that each include connection portions configured to connect to the coil, wherein the three-phase terminal groove is configured to receive one of the connection portions of the U-phase conductive plate, the V-phase conductive plate, or the W-phase conductive plate, and wherein the neutral terminal groove that is configured to receive the connection portion of the N-phase conductive plate.

14. The split-core assembly of claim 13, wherein the bobbin comprises:

a winding portion around which the coil is wound;

an outer flange that is disposed radially outward relative to the winding portion and protrudes from an outer edge of the winding portion, the outer flange being coupled to the terminal holder; and an inner flange that is disposed radially inward relative to the winding portion and protrudes from an inner edge of the winding portion, and wherein the outer flange defines:
- a first groove that receives a first end of the coil coupled to the connection portion of the N-phase conductive plate, the first groove being defined at an upper portion of the outer flange, and
- a second groove that that receives a second end of the coil coupled to one of the connection portions of the U-phase conductive plate, the V-phase conductive plate, or the W-phase conductive plate, the second groove being defined at the upper portion of the outer flange and spaced apart from the first groove.

15. The split-core assembly of claim 14, wherein the inner partition wall, the plurality of middle partition walls, and the outer partition wall are arranged in the radial direction of the stator,
- wherein an upper end of the outer flange is located higher than upper ends of the plurality of middle partition walls and the inner partition wall in the up-down direction, and
- wherein a radial gap between the outer flange and the inner partition wall is wider than a radial gap between the inner partition wall and an innermost middle partition wall among the plurality of middle partition walls.

16. The split-core assembly of claim 13, wherein the bobbin comprises a first bobbin and a second bobbin that are coupled to each other and surround the tooth, the first bobbin being coupled to an upper portion of the tooth, and the second bobbin being coupled to a lower portion of the tooth,
wherein the first bobbin comprises:
- a first winding portion around which an upper portion of the coil is wound,
- a first outer flange that is disposed radially outward relative to the first winding portion and protrudes from an outer edge of the first winding portion, the first outer flange being coupled to the terminal holder, and
- a first inner flange that is disposed radially inward relative to the first winding portion and protrudes from an inner edge of the first winding portion, and wherein the first outer flange defines:
- a first groove that receives a first end of the coil coupled to the connection portion of the N-phase conductive plate, the first groove being defined at an upper portion of the first outer flange, and
- a second groove that that receives a second end of the coil coupled to one of the connection portions of the U-phase conductive plate, the V-phase conductive plate, or the W-phase conductive plate, the second groove being defined at the upper portion of the first outer flange and spaced apart from the first groove.

17. The stator comprising the plurality of split-core assemblies that include the split-core assembly of claim 9 and are circumferentially coupled to one another other.

18. A split-core assembly of a stator of a motor, the stator including a plurality of split-core assemblies that include the split-core assembly and are arranged circumferentially about a central axis of the stator, the split-core assembly comprising:
- a split core;
- a coil wound around the split core;
- a bobbin made of an insulator and positioned between the split core and the coil; and
- a terminal holder made of an insulator, the terminal holder defining a plurality of insertion grooves configured to receive a plurality of conductive plates that are electrically connected to the coil, respectively, wherein the terminal holder comprises:
- a bottom plate that defines portions of the plurality of insertion grooves,
- an insulating protrusion that protrudes from a first end of the bottom plate in a circumferential direction of the stator, and
- an insulating groove that is defined at a second end of the bottom plate opposite to the first end of the bottom plate, wherein the insulating protrusion is coupled to and seated in the insulating groove of another split-core assembly among the plurality of split-core assemblies located adjacent to the split-core assembly, wherein the terminal holder further comprises a plurality of partition walls comprising:
- a plurality of middle partition walls that define boundaries of the plurality of insertion grooves, and
- an inner partition wall that is located closer to an end of the coil than the plurality of middle partition walls and spaced apart from the plurality of middle partition walls, wherein each of the plurality of middle partition walls and the inner partition wall defines a three-phase terminal groove arranged in a straight line, and wherein the inner partition wall further defines a neutral terminal groove.

19. The split-core assembly of claim 18, wherein the plurality of partition walls further comprise
an outer partition wall that is spaced apart from the inner partition wall in a radial direction of the stator,
wherein the plurality of conductive plates comprise a U-phase conductive plate, a V-phase conductive plate, a W-phase conductive plate, and an N-phase conductive plate that each include connection portions configured to connect to the coil,
wherein the three-phase terminal groove is configured to receive one of the connection portions of the U-phase conductive plate, the V-phase conductive plate, or the W-phase conductive plate, and
wherein the neutral terminal groove is configured to receive the connection portion of the N-phase conductive plate.

20. The split-core assembly of claim 19, wherein the insulating protrusion is disposed at a first end portion of at least one of the plurality of middle partition walls or the outer partition wall, and
wherein the insulating groove is defined at a second end portion of the at least one of the plurality of middle partition walls or the outer partition wall.

* * * * *